Patented Apr. 12, 1932

1,853,334

UNITED STATES PATENT OFFICE

HERMAN A. BRUSON, OF AKRON, OHIO, ASSIGNOR TO THE GOODYEAR TIRE & RUBBER COMPANY, OF AKRON, OHIO, A CORPORATION OF OHIO

RUBBER CONVERSION PRODUCT AND METHOD FOR ITS PREPARATION

No Drawing.     Application filed February 18, 1928. Serial No. 255,506.

My invention relates to methods of treating rubber and it has particular relation to methods for forming thermoplastic compositions from that material.

The invention has for one of its objects the provision of a thermoplastic composition which may be employed as an adhesive to form a union between rubber and metal or between various articles other than metal. A further object of the invention is to form a thermoplastic composition which may be dissolved in rubber solvents to form a lacquer or a varnish suitable for water proofing purposes, or as a shellac substitute. Still other objects and advantages will become apparent from the succeeding description.

It has, heretofore, been observed that when rubber is treated with certain reagents such as sulphuric acid, sulfonic acids, sulfonic acid chlorides, or the chlorine or bromine salts of such amphoteric metals as tin, iron, etc., a reaction occurs between the salt and the rubber and a product is obtained which is entirely different in properties from ordinary rubber. This product is dense, relatively hard and thermoplastic. Products so obtained are readily softened by the application of heat and if the reaction takes place under proper conditions, a material is obtained which may be dissolved in suitable solvents to form an adhesive capable of cementing rubber to metallic surfaces or for various other purposes of similar nature.

My invention consists in the discovery that the fluorides of certain non-metallic elements, notably those of boron, will react with rubber to produce thermoplastic materials which may be employed to obtain adhesion of rubber to metal or other surfaces, or as shellacs and varnishes.

One reagent of this class may be prepared by heating 20 grams of boric acid with 150 cc. of 48 percent commercial hydrofluoric acid and evaporating the mixture to a weight of 35 grams. The solution thus formed consists of a mixture of compounds having the following formulae: $HBF_4$ and $H_2B_2O_4.6HF$. These materials decompose when heated into boron trifluoride ($BF_3$) and hydrofluoric acid (HF).

In order to form a thermoplastic composition from rubber, 20 percent by weight of the above described compound is milled into rubber and the resulting compound is heated to a temperature of 150° C. for a period of four to five hours. The reaction results in a tough product resembling balata or gutta percha which may be homogenized and rendered soluble in benzene or carbon tetrachloride by working it for a period of fifteen to twenty minutes on a mill heated to a temperature of approximately 100° C. The product obtained may be employed as an adhesive by dissolving it in benzene or other rubber solvents and painting it upon a metallic surface, such as iron. The uncured rubber containing sulfur is then placed upon the painted surface and is subjected to vulcanization under pressure.

To obtain a hard, brittle product resembling shellac, 100 grams of boric acid are covered with 250 cc. of 48 percent hydrofluoric acid and the mixture is evaporated to a specific gravity of 1.46. This corresponds to a substantially anhydrous fluoboric acid mixture. Ten to twenty percent by weight of this material is milled into solid rubber on the mixing mill and the resulting rubber-fluoboric acid mixture is heated in an oven at a temperature of 150° C. for three hours. A hard brittle mass is formed which is worked upon hot rollers at 100° C. for fifteen minutes to render it soluble in benzol for use as a substitute for shellac.

The milling, however, may be dispensed with, and the product used directly as a molding composition. Under the influence of heat and pressure it may be molded readily to form objects suitable for electrical insulators and the like, since it possesses excellent dielectric properties.

In lieu of the boric acid, the hydrofluoric acid may be caused to react with ordinary borax ($Na_2B_4O_7$) or boric oxide to form products which, when incorporated in rubber, result in the production of thermoplastic materials. Also, instead of preparing the reaction product of hydrofluoric acid and borax prior to incorporation in the rubber, the two materials may be milled in the rubber separately, the reaction therebetween taking place within the rubber.

It is also unnecessary to mill the products into solid rubber as the rubber may first be dissolved in a solvent, such as benzene, to form a cement. The fluorides then may be added to the cement and the mixture heated at or above the boiling point of the solvent until the reaction is complete. Reaction products may be formed not only by the action of fluoborates upon ordinary raw rubber but also by the action of those materials upon reclaimed rubber and latex. The term rubber is, therefore, to be considered of sufficient scope to include the latter materials.

Although I have described in detail only the preferred forms which the invention may assume, it will be apparent to those skilled in the art that it is not so limited, but that various minor modifications may be made therein without departing from the spirit of the invention or from the scope of the appended claims. It is intended that the patent shall cover, by suitable expression in the appended claims, whatever features of patentable novelty reside in the invention.

What I claim is:

1. A method of treating rubber which comprises causing it to react with a compound of boron and fluorine under the influence of heat.

2. A method of treating rubber which comprises causing it to react with the reaction product of hydrofluoric acid and a material selected from a group consisting of boric acid and metal salts thereof.

3. A method of treating rubber which comprises causing it to react with a reaction product of hydrofluoric acid and a material selected from a group consisting of boric acid and basic salts thereof.

4. A method of treating rubber which comprises incorporating therein hydrofluoric acid and a material selected from a group consisting of boric acid and alkali salts thereof and subsequently heating the compound to form a thermoplastic reaction product.

5. A thermoplastic composition formed by the reaction of a compound of boron and fluorine upon rubber.

6. A thermoplastic composition formed by the reaction of fluoboric acid upon rubber at a temperature of approximately 150° C.

7. A thermoplastic composition formed by the incorporation of hydrofluoric acid and a material selected from a group consisting of boric acid and alkali salts thereof with rubber and subsequently heating the compound formed to a temperature of approximately 150° centigrade to form a reaction product.

8. A thermoplastic composition consisting of rubber chemically reacted with a simple salt of boron and fluorine.

9. A thermoplastic composition formed by the action of a reaction product of boric acid and hydrofluoric acid upon rubber at a temperature of approximately 150° centigrade.

10. A thermoplastic composition formed by the action of fluoboric acid upon a rubber solution under the influence of heat.

11. A thermoplastic composition formed by mixing fluoboric acid with rubber latex and subjecting the coagulum to heat to form a reaction product.

In witness whereof, I have hereunto signed my name at Akron, in the county of Summit and State of Ohio, U. S. A., this 17th day of February, 1928.

HERMAN A. BRUSON.